UNITED STATES PATENT OFFICE.

JAMES M. BUTLER AND JOHN A. SMITHHISLER, OF DANVILLE, OHIO.

OINTMENT.

SPECIFICATION forming part of Letters Patent No. 267,146, dated November 7, 1882.

Application filed June 22, 1882. (No specimens.)

*To all whom it may concern:*

Be it known that we, JAMES M. BUTLER and JOHN A. SMITHHISLER, of Danville, in the county of Knox and State of Ohio, have invented certain new and useful Improvements in Medical Compounds; and we do hereby declare that the following is a full, clear, and exact description of the invention, which will enable others skilled in the art to which it appertains to make and use the same.

Our invention has relation to medical compounds in the nature of ointments; and it consists in the specific compound or composition hereinafter more fully described and claimed.

This compound is particularly intended for the cure and alleviation of hemorrhoids, for external application.

To prepare this compound we take for a given quantity one pound of Solomon's-seal root, (*Radix polygonati multiflori*,) which, after being thoroughly dried, is ground to a fine powder, and thoroughly mixed over a slow fire with five pounds of vaseline, the compound being thoroughly stirred, after which it is left to simmer for four hours. It is then cooled off and strained through a fine cloth, or any other suitable filtering device, after which it is ready for bottling and use.

We are well aware that the product known as vaseline has been used before as a basis for salves and ointments; and we are also aware that Solomon's-seal has been used in materia medica for various purposes; but we are not aware that powdered Solomon's-seal root and vaseline have been combined before in the proportions described by us, without which a satisfactory product cannot be obtained.

We therefore claim and desire to secure by Letters Patent of the United States—

The herein-described ointment, composed of the dried and ground root of Solomon's-seal plant (*Polygonatum multiflorum*) and vaseline, mixed in the proportion set forth.

In testimony that we claim the foregoing as our own we have hereunto affixed our signatures in presence of two witnesses.

JAMES M. BUTLER.
JOHN A. SMITHHISLER.

Witnesses:
HENRY P. SMITHHISLER,
OLIVER SHAW.